UNITED STATES PATENT OFFICE.

DAVID E. PAYNTER, OF PHILADELPHIA, PENNSYLVANIA, ASSIGNOR TO THE GRANGER FERTILIZER COMPANY, OF CAMDEN, NEW JERSEY.

FERTILIZING COMPOUND.

SPECIFICATION forming part of Letters Patent No. 269,704, dated December 26, 1882.

Application filed August 25, 1882. (No specimens.)

*To all whom it may concern:*

Be it known that I, DAVID E. PAYNTER, a citizen of the United States, residing in Philadelphia, Pennsylvania, have invented a certain Fertilizing Compound, of which the following is a specification.

The object of my invention is to make at slight expense a rich fertilizing composition, in the manner and of the ingredients which I will proceed to explain.

I first take calcined gypsum, water, and coal-dust, in about the proportions of one (1) pound of gypsum to two (2) pounds of water and five (5) pounds of coal-dust. These ingredients are mixed together and the mass allowed to harden. After it is hard the mixture is calcined, preferably by utilizing it as fuel, and the resultant ashes are mixed with a quantity of urine, the latter being treated with acid, preferably sulphuric acid, to such an extent that will give a slight acid reaction when subjected to the usual tests. The quantity of urine employed will depend upon the desired character of the product, the rule being that the greater the quantity of urine employed the richer in ammoniacal salts and nitrogenous matter will be the product. I have obtained good results by the addition to the ashes of about four times their weight of urine. The mixture of ashes and urine is placed on a suitable drying-floor and subjected to heat for the purpose of evaporating the water of the urine, leaving the ammoniacal salts and nitrogenous matter combined with the ashes.

The fuel made by the mixture of calcined gypsum, water, and coal-dust may, if desired, be utilized for heating the drying-floor.

If desired, the urine, before admixture with the ashes, may be boiled, in order to partially evaporate the water; or the mixture on the drying-floor may be saturated with urine from time to time until the desired amount of ammoniacal salts and nitrogenous matter has been combined with the ashes.

In order to prevent any unpleasant odor, due to the heating of the urine, the latter may be combined with a quantity of charcoal; or the charcoal may be deposited on the drying-floor with the mixture.

Instead of treating the urine with sulphuric acid, the ashes of the gypsum and coal-dust may be thus treated, the result being the same, and sufficient acid being employed in either case to cause an acid reaction in the material treated. The purpose of the acid is to precipitate the free carbonate of ammonia in the urine and neutralize the caustic properties of the mixture of coal-ashes and gypsum. Muriatic or other equivalent acid may be employed instead of sulphuric acid; but the latter is preferred on the score of economy.

The principal expense of producing my improved fertilizer is that attending the treatment of the ingredients, as the latter at present are either comparatively inexpensive or of no marketable value.

I claim as my invention—

1. The mode herein described of preparing a fertilizing material—that is to say: first, making a compound of calcined gypsum, water, and mineral coal-dust; second, burning said compound; third, mixing the resultant ashes with urine, either the ashes or the urine having been previously acidulated, and, fourth, drying the mass so as to evaporate the water, all substantially as set forth.

2. The within-described fertilizing compound, consisting of calcined gypsum and the ashes of mineral coal, acidulated and combined with the solid matter of urine, all substantially as specified.

In testimony whereof I have signed my name to this specification in the presence of two subscribing witnesses.

DAVID E. PAYNTER.

Witnesses:
HARRY DRURY,
HUBERT HOWSON.